Dec. 29, 1953 J. R. KLEIN Re. 23,759

LOUVERED WINDOW

Original Filed Dec. 23, 1946

JOSEPH R. KLEIN,
INVENTOR.

BY Robert P. Fulwider
ATTORNEY.

Reissued Dec. 29, 1953

Re. 23,759

UNITED STATES PATENT OFFICE 23,759

LOUVERED WINDOW

Joseph R. Klein, Los Angeles, Calif.

Original No. 2,559,442, dated July 3, 1951, Serial No. 717,889, December 23, 1946. Application for reissue July 2, 1952, Serial No. 296,973

9 Claims. (Cl. 20—53)

Figure 1:
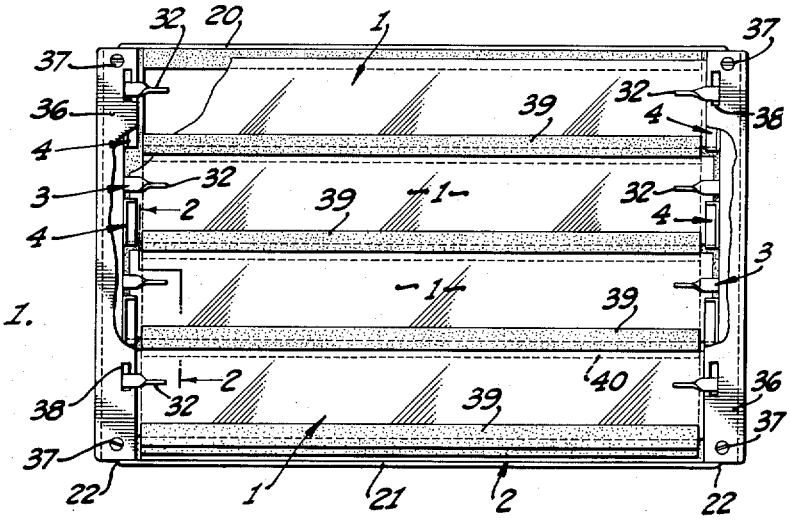

Matter enclosed in heavy brackets [ ] appears in the original patent but forms no part of this reissue specification; matter printed in italics indicates the additions made by reissue.

My invention relates generally to the field of windows, and more particularly to a louvered window in which a vertical sequence of horizontally disposed panes is supported in a manner whereby each pane may be pivoted on its lower edge to the desired position irrespective of the position of the balance of the panes.

In nearly all types of louvered windows it is desirable to be able to rotate the panes along a horizontal axis that extends lengthwise therethrough, in order that air may be admitted, and the room in which the window is installed properly ventilated. With the customary type of louvered window this is usually accomplished by an intricate mechanism that is not only costly, but bulky and awkward in appearance. It was for the purpose of eliminating the above named disadvantages that I devised the louvered window which I disclosed in my co-pending application Serial No. 655,343 that was filed March 18, 1946, now abandoned. The structure of the window described in my earlier application included a vertical sequence of horizontally positioned panes which were adapted to pivot inwardly in unison when actuated by a single pantograph mechanism, except those panes that the operator wished to remain in the closed position. In this present application a novel regulating mechanism for individually locking and regulating the position of each pane is shown.

It is a major object of my invention to supply a window in which each pane may be individually operated, and while performing all of the functions of my pantograph operated window will be so simplified structurally that it may be manufactured cheaply and sold in the low priced merchandising field.

It is another object of my invention to provide a window that requires less wall space than my previous window, in that the pantograph mechanism and the housing necessary for same have been eliminated; thus allowing the window to be used advantageously for the ventilation of small rooms such as trailers.

A further object of my invention is to supply a window that is both weather and rattleproof and particularly adapted for use with moving vehicles such as trailers, that will permit entry from the outside only by breaking the panes even when the window is in the open position, and that is of such simple construction as to allow the panes to be replaced by the average person rather than employing the specialized services of a glazier or carpenter.

A still further object of my invention is to furnish a louvered window which may be installed in vehicles, with the possibility of persons being injured by any outwardly extending window structure being eliminated, in that at no time do the panes project beyond the wall section in which the window is installed.

Figure 2:
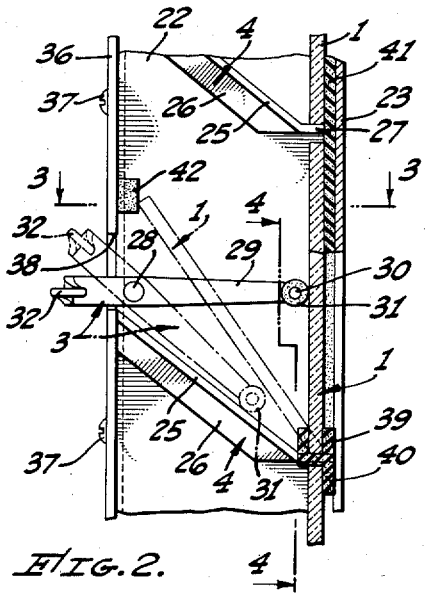
Figure 3:
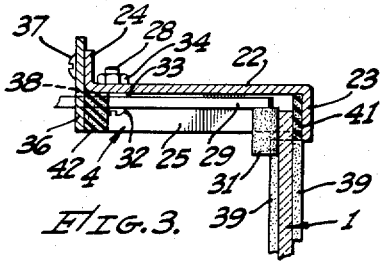
Figure 4:
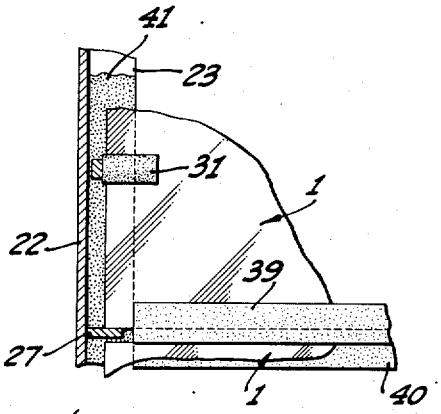
Figure 5:
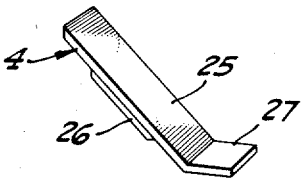

These and other objects and advantages of my invention will become apparent from the following description of a preferred form thereof, and from the drawings illustrating that form in which:

Figure 1 is an elevational view of my louvered window as viewed from the inside, Figure 2 is an enlarged fragmentary elevational section taken on the line 2—2 in Figure 1, Figure 3 is an enlarged fragmentary horizontal section taken on the line 3—3 in Figure 2, Figure 4 is an enlarged fragmentary elevational section taken on the line 4—4 in Figure 2, and Figure 5 is a perspective view of the angular bracket used in supporting the panes.

A window constructed in accordance with my present invention may be considered as formed from three primary components which are identified in the accompanying drawings by general reference numbers as follows, and include: a number of rectangular panes 1 that are arranged in vertical sequence with relation to one another, a frame 2 for pivotally supporting the panes, and an independent adjustment and locking mechanism 3 for controlling the position of each pane.

Referring to the drawing and particularly to Figure 1 it will be seen that the frame 1 includes top and bottom pieces 20 and 21 respectively which may be formed from any rigid, weather resisting material of angular cross section rigidly connected to one another at each end thereof by rectangular end pieces 22 of similar material. Rigidly affixed to the edges of each of the end members 22 are a pair of vertical flanges 23 and 24, the functions of which will hereinafter be pointed out. The flanges 23 are affixed to the outer edges of the members 22 and disposed inwardly toward one another, while the flanges 24 are similarly attached to the inner edges of the end members but disposed outwardly away from one another as best seen in Figure 3. Although the end members for the window frame may be fabricated from the component strips and flanges as previously described, in the quantity production of my window I prefer to use commercial material having the desired Z-shaped cross section.

For supporting the panes 1 from the frame 2 a number of brackets 4 are provided, each of which includes a diagonally disposed member 25 that not only serves to guide a pane when it is being removed or inserted into the frame, but prevents thieves and would-be trespassers from vertically displacing the panes in the window and thus securing unlawful entry therethrough. A downwardly disposed flange 26, secured to the outer edge of the diagonal member 25, serves to support the bracket 4 from the interior face of the end member 22 by being welded or brazed thereto. A short horizontal toe 27, rigidly attached to the lower edge of the diagonal member 25, serves to support the bracket 4 from the interior face of the end member 22 by being welded or brazed thereto. The short horizontal toe 27, rigidly attached to the lower edge of the diagonal member 25, serves as a pivotal support for a pane 1 when its lower edge is placed thereon. It will be apparent from an examination of Figure 5 that in large scale production, the brackets 4 may be fabricated from commercial angle iron by first removing a portion of one flange therefrom, and then bending the remaining flange into the desired angle to form the toe 27.

For pivotally supporting the panes 1 from the frame 2 a number of the brackets 4 are attached to the inner faces of the end members 22, with each bracket being placed in the same horizontal plane as a like bracket situated on the opposite end member, and with the diagonal members 25 and the horizontal toes 27 aligned with one another. A pane 1 is now placed on each pair of brackets 4, with the lower edge of each pane being pivotally mounted on the horizontal toes 27 as may best be seen in Figure 1.

For locking the panes in closed position as shown in solid line in Figure 2, and for holding them in the intermediate position as shown in solid line in Figure 2, and for holding them in the intermediate position between this and the open position shown by phantom lines in the same figure, the independent regulating mechanisms 3 are employed. Although each of the panes has been supplied with a regulating mechanism 3 at each end thereof, this is a matter of convenience for the occupant of the room as either of the mechanisms may be used in controlling the position of the pane. However, when the pane is locked to the frame, and particularly if the window is being subjected to vibration such as in a trailer, I have found it desirable to place both of the adjustment mechanisms 3 in the locked position to prevent unnecessary strain being placed on the pane due to sudden shock.

In structure the regulating mechanism 3 includes a lever 29 that is rotatably mounted on a machine screw 28 which is perpendicularly disposed on the interior face of the end member 22, and located above the upper portion of the diagonal member 25 as best seen in Figure 2. Disposed on the end of the lever 29 adjacent to the pane 1 is a horizontal pin 30 that serves to rotatably support a resilient roller 31 which is not only used as a rest for the pane 1 when it is in the partially open position, but as a locking means when the pane is placed in the closed position. Situated on the opposite end of the lever 29 and used for actuating same is a handle 32 which I have found convenient to form by bending a portion of the lever 29 at an angle of substantially 90 degrees thereto as best seen in Figure 2.

It will be apparent that for the pane 1 to be retained in an intermediate position by resting on the roller 31 that frictional means must be employed to prevent the lever 29 from rotating downwardly due to the weight of the plane which it supports. To achieve this result I rotatably support the lever 29 on the machine screw 28 between a head 32 and a washer 33, with the entire assembly being held on the interior face of the end member 22 by a self locking nut 34 that engages the machine screw as it emerges on the outer face of the end member. Thus by revolving the head 32 the desired friction may be placed upon the lever 29; sufficient to allow the lever to be moved by the operator to regulate the position of the pane, but great enough to prevent the lever from rotating downwardly due to the weight of the pane which it supports.

In placing the pane 1 in the closed position, which is automatically the locked position, the handle 32 is pressed downwardly to cause the roller 31 situated on the opposite end of the lever 29 to move upwardly in a vertical arc, and rotate along the inner face of the pane as it pivots same on its lower edge into the closed position. It will be obvious that any vertical component of force generated by the upward movement of the arm 29 and tending to lift the pane 1 from the brackets 4 as it pivots same into the closed position is eliminated by the use of the roller 31.

To prevent the panes 1 from being slid inwardly and removed from the frame 2 by would-be trespassers or thieves, a vertical strip 36 is provided that extends inwardly past the outside edge of each pane and is removably secured to each flange 24 by a number of machine screws 37, as best seen in Figure 1. It will be noted that a number of vertically disposed slots 38 located along the inner edge of the strips 36 allow the arms 29 to project therefrom in a vertically movable position. Thus with the strips 36 in place and with the upper end of each diagonal member 25 in contact therewith, it will be seen that neither can the panes 1 be removed from the frame 2, nor can they while remaining in the frame be shifted to the top or bottom thereof to secure unlawful entry from the outside, as the end portion of each pane is enclosed in an inwardly extending trapezoidal section which is bounted on the top and bottom by the brackets 4, on the inside by the strip 36, and on the outside by the flange 23.

In order to both weatherproof the window as well as to eliminate rattles that may arise therefrom when same is installed in a vehicle I have provided a U-shaped molding 39, that is fabricated from a resilient material, and which I slip over that portion of the lower edge of each pane that is not resting on the brackets 4. A depending member 40 affixed to the lower portion of the U-shaped molding 39 serves to conduct any water or moisture accumulating on the outside of the panes downwardly from one to the other, and thus eliminates the possibility of any inward seepage which might take place at the horizontal junction of the panes. Although I have found from experience that rubber gives excellent service when used as a material for the molding 39, it will be apparent that any weather and water proof material such as cellulose acetate or a similar material may be used for this purpose with equally satisfactory results.

For weather and rattle proofing the end members 22, a vertical strip 41 which may also be made from rubber, cellulose acetate, or a similar material is affixed to the interior face of the flange 23 as best seen in Figure 3. It will be noted that the strip 41 encloses that portion of the junction between adjacent panes which is not covered by the molding 39. As a further precaution against rattling, as well as to prevent chipping or breaking of the panes when they are rapidly placed in the open position, a number of resilient pads 42 are placed along the outer face of each strip 36 and so disposed as to serve as a rest for the upper edge of the panes 1 when same are in the fully open position as best seen in Figure 2. For holding the pads 42 in the desired position on each strip 36 I have employed a suitable adhesive or glue.

Due to the simple mechanical structure of my window the operation of the device will readily become apparent from an examination of Figure 2. Each of the panes 1 is independently controlled from the balance of the panes by dual regulating mechanisms 3, either of which may be used for this purpose at the option of the operator. To place a pane in the closed position, one of the handles 32 is pressed downwardly to cause the opposite end of the lever 29 to swing upwardly in a vertical arc, with the upper portion of the pane 1 supported on the resilient roller 31. Thus as the upper portion of the pane 1 is forced inwardly toward the frame by the roller 31, the lower edge of the pane 1 pivots on the pair of supporting brackets 4 until the pane is parallel with the frame and the lever 29 is normal thereto. In this position the pane is not only closed but locked, for as the roller 31 is forced into the closed position it is also slightly compressed and tends to retain the lever 29 in the perpendicular position with relation to the pane until an upward force is applied to the handle 32. Therefore, it will be apparent that the vertical component of force necessary to revolve the lever 29 downwardly and allow the pane to assume the open position cannot be applied from outside the window irregardless of the pressure applied.

In opening the window the process is merely reversed with the handle 32 being raised upwardly to cause a downward movement of the opposite end of the lever 29 that supports the roller 31. Thus as the roller 31 moves downwardly away from the frame 2, the pane 1 pivots inwardly on its lower edge due to gravity, with its position being determined by that of the roller 31. It will be noted from an examination of Figure 2 that in the closed and intermediate positions the pane is resting on the roller 31 but in the open position, is resting on its upper edge against the pad 42, with the lever 29 disposed between the diagonal member 25 and the lower portion of the pane.

For the removal or replacement of panes which may be broken or damaged after the assembly of the window has been completed, the strips 36 are removed from the flanges 24 and the levers 29 revolved into a position where the panes may be conveniently slid edgewise from the frame. It will be obvious that in the assembly of the window after the frame 2 has been installed in the desired position that the levers 29 may be revolved to a similar position, the panes slid into the frame 2 edgewise urging the diagonal members 25 as guides, and when the operation has been finished affixing the strips 36 to the flanges 24 to complete the window structure.

While the particular apparatus herein shown and described in detail is fully capable of attaining the objects and providing the advantages herein before stated, it is to be understood that it is merely illustrative of the presently preferred form of my invention, and that I do not mean to limit myself to the details of construction or design herein shown, other than defined in the appended claims.

I claim:

1. A window structure including a substantially rectangular frame provided with two laterally spaced vertical end members, a plurality of brackets supported as horizontally aligned pairs on the facing surfaces of said end members, each of said brackets having a horizontally disposed supporting portion, a plurality of substantially rectangular [panes] *panels* extending across said frame with the lower edge of each of said [panes] *panels* near the ends of each of said [panes] *panels* resting freely on said supporting portions of a pair of said brackets, resilient vertical strips having rigid backing means mounted on said end members outside and adjacent said supporting portions for engagement by marginal end portions of the *panels* [panes] on the outer surfaces of the *panels* [panes], elongated resilient elements substantially U-shaped in cross section horizontally disposed between said vertical strips and each having a marginal lower edge portion of one of said *panels* [panes] received therein, a plurality of independent lever means pivotally mounted on the facing surfaces of said end members and extending from inside toward the outside, the pivot of each lever means being substantially in the horizontal plane passing through the horizontal median of each *panel* [pane], and the length of the lever means from the pivot to the inside surface of the *panel* [pane] being such that when the lever is substantially in a horizontal position the *panel* [pane] is urged against said resilient vertical strips, a depending flange on the outside edge of each of said horizontally disposed resilient elements for engagement by an upper marginal edge portion of the next lower *panel* [pane] when said next lower [pane] *panel* is urged against said vertical strips, and means secured to the inside of the frame and disposed inwardly of said [panes] *panels* to prevent inward removal of the *panels* [panes] from the frame.

2. A window structure in accordance with claim 1 in which said lever means are provided at their outer ends with resilient end pieces for engagement with the *panels* [panes] when the lever means are substantially in a horizontal position.

3. A window structure in accordance with claim 1 in which each of said brackets includes an inclined portion merging into said horizontally disposed supporting portion adjacent the lower edge of the *panel* [pane] resting thereon and extending upwardly and inwardly from said supporting portion.

*4. A window structure including two laterally spaced vertical end members to be secured in fixed operating relationship relative to each other, a plurality of brackets supported as horizontally aligned pairs on the facing surfaces of said end members, each of said brackets having a horizontally disposed supporting portion, a plurality of substantially rectangular panels extending between said end members with the lower edge of each of said panels near the ends of each of said panels resting freely on said supporting portions of a pair of said brackets, resilient vertical strips having rigid backing means mounted on said end members outside and adjacent said supporting portions for engagement by marginal end portions of the panels on the outer*

*surfaces of the panels, elongated resilient elements substantially U-shaped in cross section horizontally disposed between said vertical strips and each having a marginal lower edge portion of one of said panels received therein, a plurality of independent lever means pivotally mounted on the facing surfaces of said end members and extending from inside toward the outside, the pivot of each lever means being substantially in a horizontal plane passing through the horizontal median portion of each panel, and the length of the lever means from the pivot to the inside surface of the panel being such that when the lever is substantially in a horizontal position the panel is urged against said resilient vertical strips, a depending flange on the outsde edge of each of said horizontally disposed resilient elements for engagement by an upper marginal edge portion of the next lower panel when said next lower panel is urged against said vertical strips, and means mounted on each of said end members rearwardly of said strips a distance less than the height of said panels and projecting towards the other end member to restrain inward removal of the panels from the brackets.*

*5. A window structure including two laterally spaced vertical end members to be secured in fixed operating relationship relative to each other, a plurality of brackets supported as horizontally aligned pairs on the facing surfaces of said end members, each of said brackets having a horizontally disposed supporting portion, a plurality of substantially rectangular panels extending between said end members with the lower edge of each of said panels near the ends of each of said panels resting freely on said supporting portions of a pair of said brackets, resilient vertical strips having rigid backing means mounted on said end members outside and adjacent said supporting portions for engagement by marginal end portions of the panels on the outer surfaces of the panels, elongated resilient weather-sealing elements horizontally disposed between said vertical strips and each carried by a marginal lower edge portion of one of said panels, a plurality of independent lever means pivotally mounted on the facing surfaces of said end members and extending from inside toward the outside, the pivot of each lever means being substantially in a horizontal plane passing through the horizontal median portion of each panel, and the length of the lever means from the pivot to the inside surface of the panel being such that when the lever is substantially in a horizontal position the panel is urged against said resilient vertical strips, means for limiting the angular movement of the lever means at the end of its panel opening movement, and a depending flange on the outside edge of each of said horizontally disposed resilient elements for engagement by an upper marginal edge portion of the next lower panel when said next lower panel is urged against said vertical strips.*

*6. A window structure including two laterally spaced vertical end members to be secured in fixed operating relationship relative to each other, a plurality of brackets supported as horizontally aligned pairs on the facing surfaces of said end members, each of said brackets having a horizontally disposed supporting portion, a plurality of substantially rectangular panels extending between said end members with each panel being supported on its lower edge by a pair of said brackets for free rocking movement, resilient vertical strips having rigid backing means mounted on said end members outside and adjacent said supporting portions for engagement by marginal end portions of the panels on the outer surfaces of the panels, elongated resilient weather sealing elements horizontally disposed between said vertical strips and between the adjacent horizontal edges of adjoining panels, a plurality of independent lever means pivotally mounted on the facing surfaces of said end members and extending from inside toward the outside, the pivot of each lever means being substantially in a horizontal plane passing through the horizontal median portion of each panel, and the length of the lever means from the pivot to the inside surface of the panel being such that when the lever is substantially in a horizontal position the panel is urged against said resilient vertical strips, and means for limiting the angular movement of the lever means at the end of its panel opening movement.*

*7. A window structure including two laterally spaced vertical end members to be secured in fixed operating relationship relative to each other, a plurality of brackets supported as horizontally aligned pairs on the facing surfaces of said end members, each of said brackets having a horizontally disposed supporting portion, a plurality of substantially rectangular panels extending between said end members with the lower edge of each of said panels near the ends of each of said panels pivotally resting on said supporting portions of a pair of said brackets, resilient vertical strips having rigid backing means mounted on said end members outside and adjacent said supporting portions for engagement by marginal end portions of the panels on the outer surfaces of the panels, elongated resilient weather-sealing elements horizontally disposed between said vertical strips and each having a marginal lower edge portion of one of said panels engaged thereby, a plurality of lever means pivotally mounted on the facing surfaces of said end members and extending from inside toward the outside, the pivot of each lever means being substantially in a horizontal plane passing through the horizontal median portion of each panel, and the length of the lever means from the pivot to the inside surface of the panel being such that when the lever is substantially in a horizontal position the panel is urged against said resilient vertical strips, means on each of said horizontally disposed resilient elements for overlapping engagement with an upper marginal edge portion of the next lower panel when said next lower panel is urged against said vertical strips, and means to restrain the angular movement of said lever means while the same is in engagement with said panels to thereby restrain movement of said panels.*

*8. A window structure for use with a plurality of substantially rectangular panels adapted to be pivotally mounted in a common vertical plane, which includes: a pair of end members to be secured in fixed operating relation relative to each other to receive said panels therebetween, a plurality of brackets supported on said end members, each of said brackets having a shelf portion for pivotally supporting an end of one of said panels thereon, resilient vertical strips rigidly supported on said end members outside and adjacent said supporting brackets for engagement with the outer face of the end portions of said panels, elongated resilient weather-sealing elements to be extended horizontally between adjacent edges of adjoining panels between said vertical strips and each to be attached to a horizon-*

*tal marginal edge of one of said panels and to engage the adjacent edge portion of an adjoining panel when said panels are urged against said vertical strips, and a plurality of lever means pivotally mounted on the facing surfaces of said end members and extending toward the outside thereof, the pivot of each lever means being adjacent the horizontal plane passing through the horizontal median of each panel when the same is supported on said brackets, and the length of each lever means from the pivot to the inside surface of such panel being such that when the lever means is substantially horizontal the panel will be urged against said resilient vertical strips, and means for limiting rearward pivotal movement of said lever means.*

*9. In a louvered window structure having a plurality of rectangular panels disposed in parallel relation one above the other, the combination of a pair of end members to be vertically mounted in horizontal spaced relation in a window opening, a plurality of panel supporting brackets on the opposed faces of said end members arranged in horizontal pairs to support opposite ends of the lower edge portions of said panels for free pivotal movement thereon, means to arrest forward movement of the panels including resilient means mounted along the vertical length of said end members to receive said panels thereagainst and make waterproof contact therewith when said panels are in their forward closed position, a plurality of lever means, one for each*

*of said panels, pivotally mounted on said end members in vertical spaced relation and extending forwardly to engage said panels, the pivot point of each lever means being horizontally behind the mid-portion of its corresponding panel and the length of said lever means from the pivot to the inside surface of such panel being such as to urge said panel into firm engagement with said vertical resilient means when said lever means is moved to a substantially horizontal position, means to limit rearward pivoting of said lever means when in its retracted position, and elongated resilient elements disposed between the adjacent upper and lower edges of adjoining panels, and provided with portions to engage the adjacent edges of said adjoining panels to form therewith a watertight seal when said panels are in their forward closed position in engagement with said vertically disposed resilient strips, whereby to provide a complete watertight window structure formed of individually movable panels.*

JOSEPH R. KLEIN.

References Cited in the file of this patent or the original patent

UNITED STATES PATENTS

| Number | Name | Date |
|---|---|---|
| 1,243,575 | Alexander | Oct. 16, 1917 |
| 2,057,815 | Boehm | Oct. 24, 1936 |
| 2,131,251 | Ferri | Sept. 27, 1938 |
| 2,395,319 | Davies | Feb. 19, 1946 |